(12) United States Patent
Bussmann et al.

(10) Patent No.: US 9,507,110 B2
(45) Date of Patent: Nov. 29, 2016

(54) DEVICE SOCKET

(71) Applicant: Harting Electronics GmbH, Espelkamp (DE)

(72) Inventors: Rainer Bussmann, Bad Essen (DE); Marc Lindkamp, Luebbecke (DE)

(73) Assignee: HARTING ELECTRONICS GMBH, Espelkamp (DE)

( * ) Notice: Subject to any disclaimer, the term of this patent is extended or adjusted under 35 U.S.C. 154(b) by 0 days.

(21) Appl. No.: 14/765,959

(22) PCT Filed: Feb. 10, 2014

(86) PCT No.: PCT/DE2014/100047
§ 371 (c)(1),
(2) Date: Aug. 5, 2015

(87) PCT Pub. No.: WO2014/121791
PCT Pub. Date: Aug. 14, 2014

(65) Prior Publication Data
US 2015/0378117 A1    Dec. 31, 2015

(30) Foreign Application Priority Data

Feb. 8, 2013 (DE) .................. 10 2013 101 267

(51) Int. Cl.
*G02B 6/42* (2006.01)
*G02B 6/38* (2006.01)

(52) U.S. Cl.
CPC ............. *G02B 6/4292* (2013.01); *G02B 6/428* (2013.01); *G02B 6/4244* (2013.01); *G02B 6/4245* (2013.01); *G02B 6/4261* (2013.01); *G02B 6/3825* (2013.01); *G02B 6/3897* (2013.01)

(58) Field of Classification Search
CPC .. G02B 6/423; G02B 6/4244; G02B 6/4245; G02B 6/426; G02B 6/4261; G02B 6/428; G02B 6/4292
USPC ...................................... 385/88, 92
See application file for complete search history.

(56) References Cited

U.S. PATENT DOCUMENTS

| | | |
|---|---|---|
| 5,138,680 A | 8/1992 | Briggs et al. |
| 6,554,494 B2 | 4/2003 | Bruland et al. |
| 6,762,941 B2 | 7/2004 | Roth |
| 8,408,810 B2 | 4/2013 | Hoffmann et al. |
| 2007/0036489 A1* | 2/2007 | Grzegorzewska ... H01R 13/508 385/88 |
| 2007/0140621 A1 | 6/2007 | DeCusatis et al. |
| 2010/0261378 A1 | 10/2010 | Davison et al. |
| 2013/0078870 A1 | 3/2013 | Milbrand, Jr. |

FOREIGN PATENT DOCUMENTS

| | | |
|---|---|---|
| CN | 1987539 | 6/2007 |
| CN | 101283486 | 10/2008 |
| DE | 10008301 | 9/2001 |
| DE | 60311111 | 12/2007 |
| DE | 102009011388 | 8/2010 |
| JP | S63-17854 | 8/1989 |

* cited by examiner

*Primary Examiner* — Ryan Lepisto
(74) *Attorney, Agent, or Firm* — Jacobson Holman, PLLC.

(57) ABSTRACT

A device socket that includes a wall feedthrough, a printed circuit board and an electronic component attached to the printed circuit board. The device socket has a lock mechanism to connect the printed circuit board to the wall feedthrough. The wall feedthrough has an opening. The device socket has at least one seal with an opening which cooperates with the electronic component to adjust the position of the electronic component relative to the wall feedthrough and wall feedthrough opening.

9 Claims, 4 Drawing Sheets

DEVICE SOCKET

Figure 1:
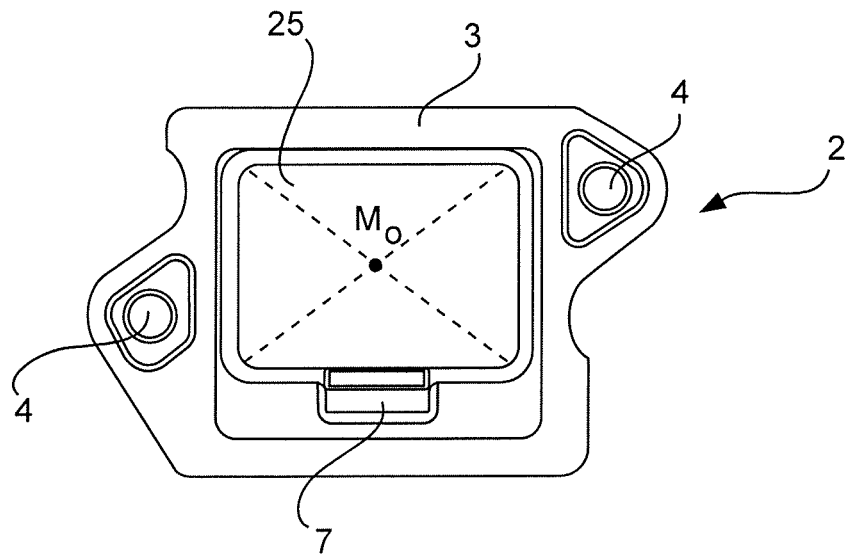

The invention relates to a device socket including a wall feedthrough, a printed circuit board connected thereto, and an electronic component attached to the printed circuit board.

Such device sockets are used in electronic devices in order to supply these devices for example with data signals. However, the device socket can also be used to ensure the power supply of the devices.

PRIOR ART

DE 10 2009 011 388 B3 shows a plug-in connector that transmits optical signals via optical fibres which are held in so-called ferrules. The position of the ferrules in the plug-in connector is not standardised, so that the plug-in connectors must have at least some axial compensation for the ferrules in order to allow them to be designed so that they can be plugged into different sockets. Oftentimes, also horizontal compensation has to be provided in addition to the axial compensation. Such a plug-in connector is complex to manufacture and therefore expensive.

If one wants to use low-cost optical plug-in connectors that have no length and height compensation (so-called conventional plugs), one has to buy plug-in connectors and sockets that are matched to each other. As a result, one often becomes dependent on a certain manufacturer.

OBJECT OF THE INVENTION

It is the object of the invention to propose a device socket that allows the use of non-standardised conventional plugs.

This object is achieved by means of the characterising features of the subject matter of claim 1.

Advantageous embodiments of the invention are indicated in the dependent claims.

So far, experts were of the opinion that the problem of length and height compensation of non-standardised plug-in connectors cannot be solved via the device socket, because the devices that have the socket integrated therein do not provide enough space, so-called installation space.

In literature sources, a person skilled in the art will be able to find length and height compensation solutions only on the plug side.

The device socket according to the invention provides length and height compensation without requiring more installation space therefor.

The proposed device socket substantially consists of a wall feedthrough that is screwed for example into a recess in a device wall that is provided for this purpose.

Further, the device socket comprises a printed circuit board, onto which an electronic component is attached. The electronic component preferably has a socket for a plug-in connector, with the plug-in direction into the socket being orientated substantially perpendicular relative to the device wall.

The device socket has a locking means that connects the printed circuit board with the wall feedthrough. Preferably, this connection is designed to be reversible. Since the electronic device is attached to the printed circuit board, also the component is thus connected to the device socket. The socket of the electronic component is located within the wall feedthrough. Through the opening in the wall feedthrough, a plug-in connector can be plugged in to the device socket from the outside.

Advantageously, the locking means mentioned above are integrally moulded to the wall feedthrough.

The device socket has first means for determining the vertical position of the electronic component within the wall feedthrough. By means of the first means, it can for example be established whether the socket is located further to the rear or to the front of the wall feedthrough. This can also be referred to as length compensation.

Second means are provided for determining the horizontal position of the electronic component in relation to the wall feedthrough. The second means may for example be used for establishing whether the socket is located further towards the top or the bottom of the wall feedthrough. This can also be referred to as height compensation. The lateral position may equally be determined. This may be referred to as lateral compensation within the height compensation plane.

Such a device socket can be adjusted in such a way that various non-standardised conventional plugs can be plugged in. Such a device socket enhances the overall quality of the device because the customer no longer needs to make sure during operation that they have the proper plug. Moreover, such a socket will not be damaged if an attempt is made to plug in a non-matching plug. Finally, the device socket can be adapted to the respective plug-in connector.

Advantageously, the device socket has a seal that is provided within the wall feedthrough, surrounds the electronic component and as a result seals the opening of the wall feedthrough against media such as for example dust. The seal is provided with the first means, by means of which the vertical position of the electronic component can be adjusted.

The seal is a particularly low-cost component of the device socket. It is therefore easily possible to store a relatively large number of different seals with a different vertical positioning of the electronic component.

The seal has an opening, the edge of which surrounds the electronic component. If one looks at the centre of the opening within the radial plane and compares it with the centre of the opening of the wall feedthrough of the same plane, one will notice that the centres have a distance from each other. The two centres do not coincide with each other. A calculation of geometry would show that the amount of the distance vector of the centres would be greater than zero.

Advantageously, the printed circuit board comprises the second means, by which the horizontal position of the electronic component relative to the wall feedthrough can be determined.

Advantageously, the electronic component is provided with solder termination elements, so-called solder pins. The printed circuit board contains bores, into which the solder termination elements are inserted and which can be connected to the conductor paths of the printed circuit board. The bores constitute the second means. Depending on the position of the bores, the horizontal position of the electronic component on the printed circuit board and thus also in relation to the wall feedthrough also changes.

The printed circuit board is easily replaced because it is reversibly connected to the wall feedthrough. Various printed circuit boards with different bores that are axially displaced relative to each other can be stored.

Advantageously, the printed circuit board may have so-called drilling templates, so that the electronic component can be connected thereto in different positions.

In a particularly preferred embodiment, the electronic component is an electro-optical converter, into which the ferrule plug-in connectors already mentioned above are plugged, which as a rule require height and length compensation. Alternatively, the electronic component is a plug-in connector. Each of the above-mentioned components have a socket on the plug-in side.

Advantageously, the device socket has a printed circuit board plug that is connected to the printed circuit board. The printed circuit board plug is connected to the electronic component via the conductor paths of the printed circuit board. The connected cable, which extends from the printed circuit board plug, can be connected to the electronics of the device. As a rule, this cable leads to a printed circuit board of the device.

A particularly preferred embodiment of the invention is designed as follows:
a device socket, consisting of a wall feedthrough, a printed circuit board and an electronic component attached to the printed circuit board, wherein the device socket comprises locking means so that the printed circuit board can be connected to the wall feedthrough,
wherein the device socket has at least one seal which comprises first means by which the vertical position (y) of the electronic components on the printed circuit board is predetermined,
wherein the seal has an opening into which the electronic component can be inserted, wherein a centre (Md) is located in the opening plane of the seal and the opening of the wall feedthrough has a centre (Mo), and wherein the centres (Md, Mo) have a distance from each other, the amount of which is greater than zero,
wherein the printed circuit board comprises second means by which the horizontal position (x) of the electronic component relative to the wall feedthrough is predetermined, wherein the electronic component comprises solder termination elements and the second means of the printed circuit board are implemented as bores into which the solder termination elements of the electronic component can be inserted.

This constellation allows an altogether particularly compact design of the device socket according to the invention.

EMBODIMENT EXAMPLE

Figure 2:
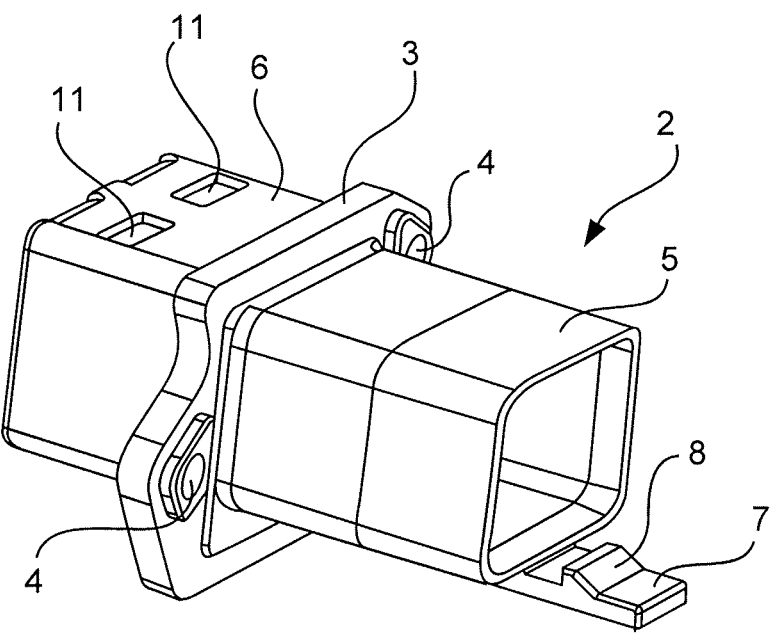
Figure 3:
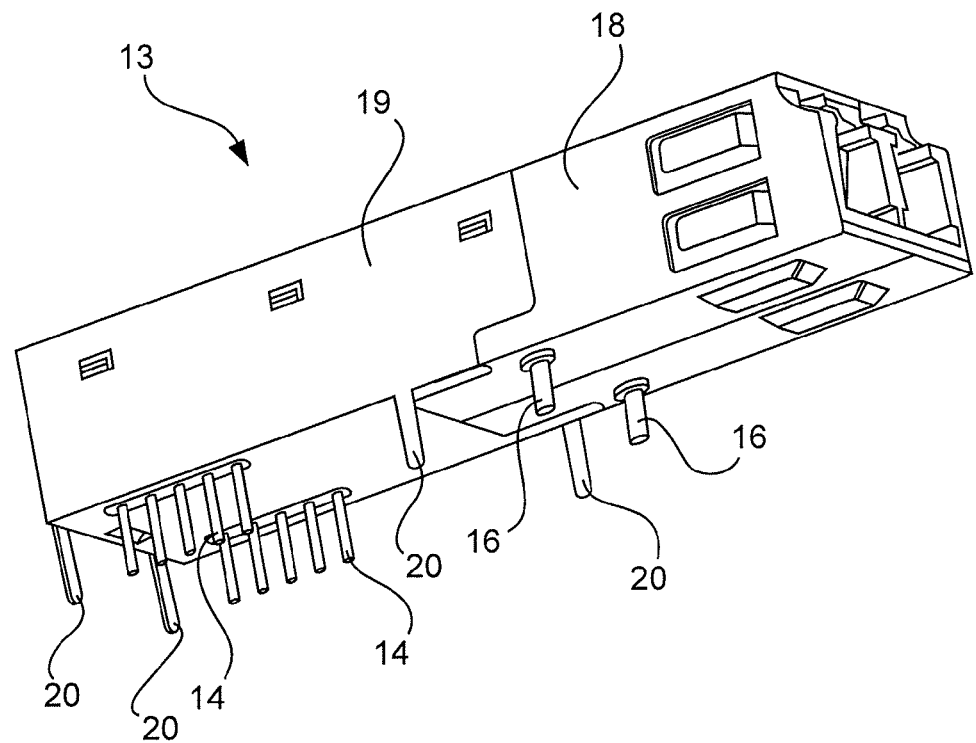
Figure 4:
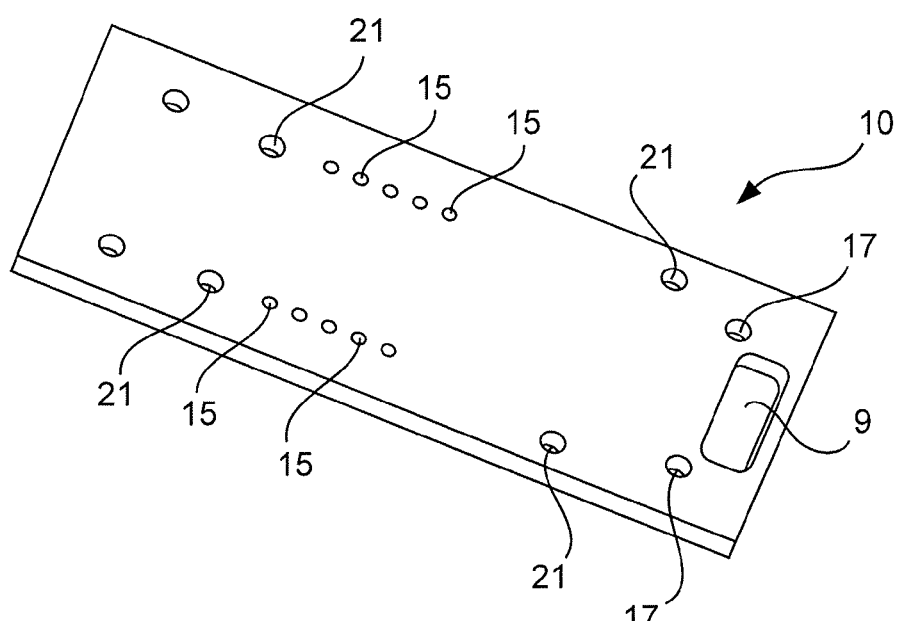
Figure 5A:
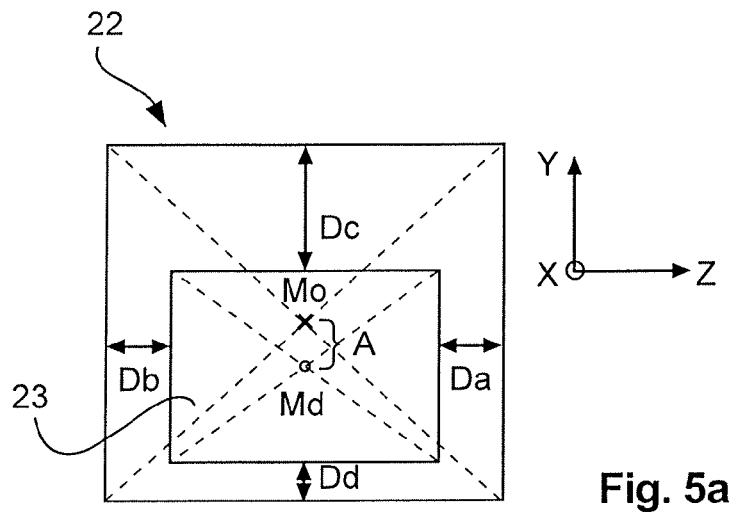
Figure 5B:
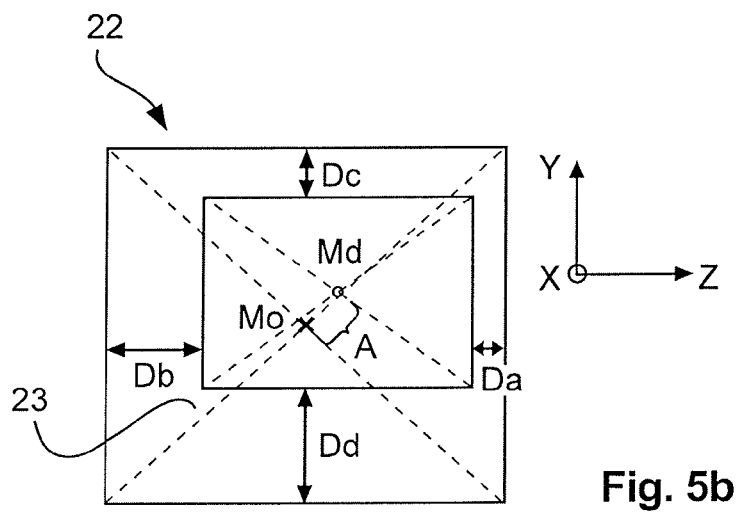
Figure 5:
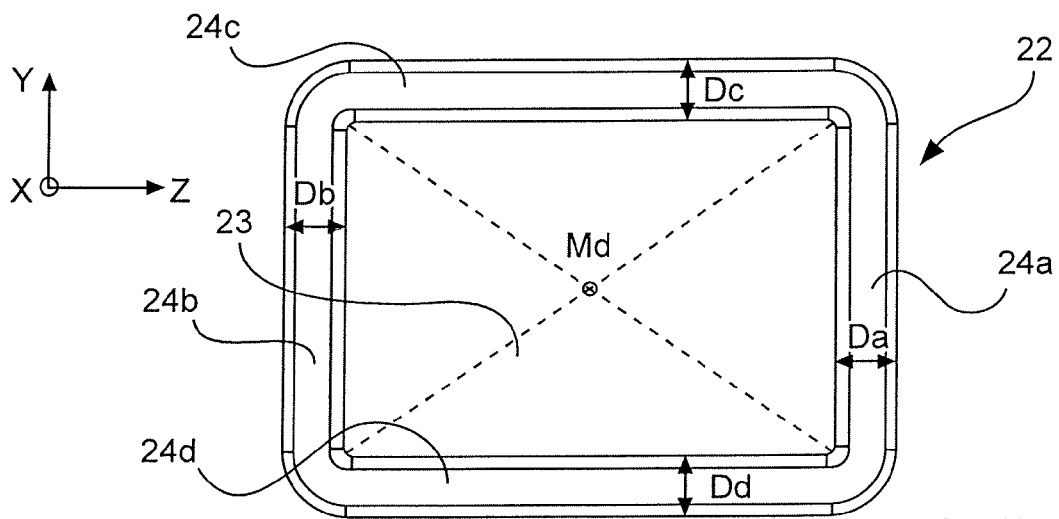
Figure 6:
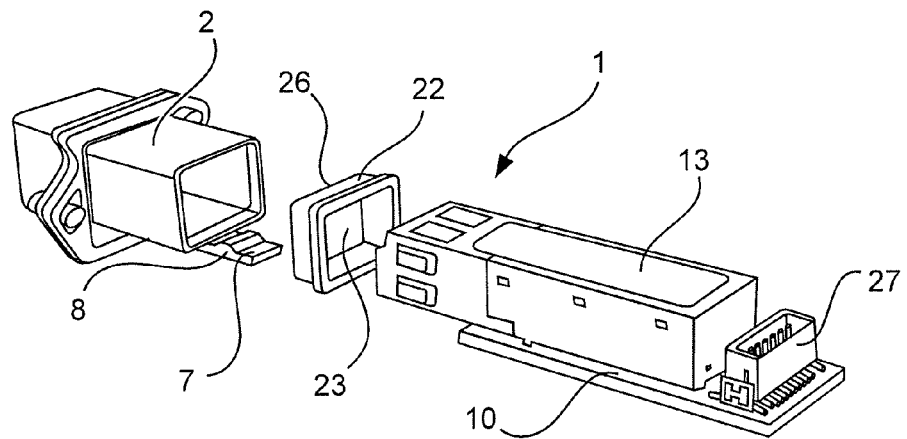
Figure 7:
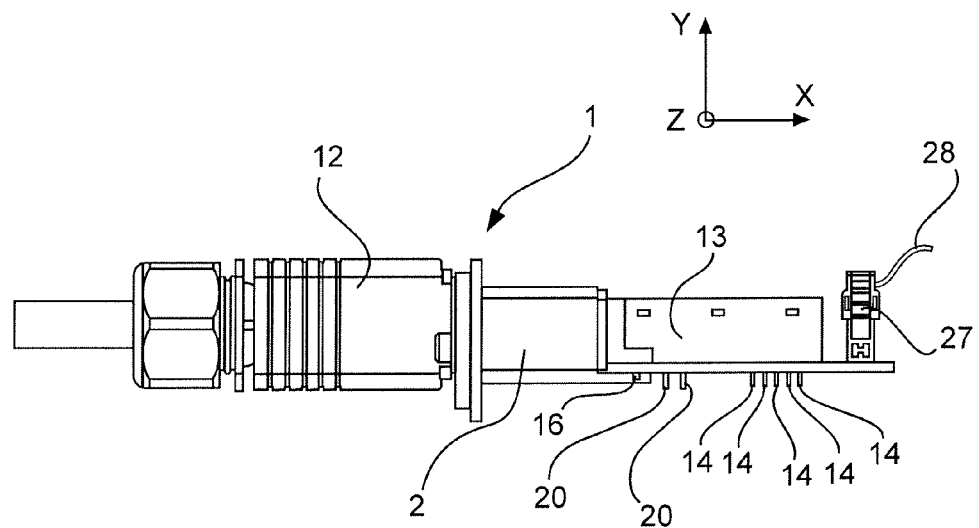

An embodiment example of the invention is shown in the drawings and will be explained in more detail below, wherein:

FIG. 1 shows a top view of a wall feedthrough,
FIG. 2 shows a perspective view of the wall feedthrough,
FIG. 3 shows a perspective view of an electronic component,
FIG. 4 shows a perspective view of a printed circuit board,
FIG. 5 shows a top view of a seal,
FIG. 5a shows a top view of an alternative seal,
FIG. 5b shows a further top view of an alternative seal,
FIG. 6 shows a perspective, partially exploded view of a device socket, and
FIG. 7 shows a lateral view of the device socket with an inserted optical plug-in connector.

FIG. 1 shows a wall feedthrough 2 of a device socket 1 according to the invention. The wall feedthrough 2 is substantially designed as a cylinder with a square base area. Approximately at the centre, the cylinder has a circumferentially extending collar 3 that includes two bores 4 orientated diagonally to each other. These bores 4 can be used to fix the wall feedthrough 2 to a device wall of a device (not shown).

The wall feedthrough 2 has an opening 25. In the plane of the opening, the centre Mo of the opening is located.

The part 5 of the wall feedthrough 2 that protrudes into the device has a locking means 7. The locking means 7 is formed as an elongate tongue with a snap-in hook 8. The snap-in hook 8 engages in a recess 9 of the printed circuit board 10, as a result of which the printed circuit board 10 and the wall feedthrough 2 are reversibly connected to each other.

The part 8 of the wall feedthrough 2 that protrudes from the device has two notches 11 on each of its two sides which are used for fixing a plug-in connector 12 inserted into the device socket 2.

FIG. 3 shows an electronic component 13 which is here designed as an electro-optical converter. This electro-optical converter is also known by persons skilled in the art as an SFF transceiver.

The electronic component 13 comprises solder termination elements 14, so-called solder pins, which may be introduced into bores 15 of the printed circuit board 10 and soldered there, in order to generate an electric contact with the conductive paths (not shown) of the printed circuit board 10.

In the front region, the electronic component 13 has further pins 16, which are also introduced into bores 17 of the printed circuit board and soldered there. The pins are conductively connected to the front housing portion 18 and provide, in combination with the housing portion 18, shielding against electromagnetic radiation.

Pins 20 also protrude from the rear housing portion 19 of the component 13 and are also inserted into bores 21 of the printed circuit board and soldered there. Electromagnetic shielding for the components (not shown) not covered by the housing portion 19 is achieved via the rear housing portion 19.

In this way, the bores 15, 17, 21 may be combined on the printed circuit board as a so-called drilling template. The drilling template constitutes the second means according to the invention for vertically positioning the electronic components 13 on the printed circuit board 10.

Ideally, the printed circuit board 10 includes at least two different drilling templates which are offset from each other in an axial direction (x) and preferably also in a direction (z) perpendicular thereto. As a result, the electronic component 13 can, depending on requirements, be positioned further towards the front or the rear and/or laterally.

The second means may also be implemented differently. For example, the electronic component may be fixed to the printed circuit board via individual, flexible conductors. In this case, the component 13 might then for example be movable via a slide in an axial direction (x).

FIG. 5 shows the seal 22 of the device socket 1. Also further seals may be provided, which seal the wall feedthrough 2 for example via the collar 3. The seal 22 has an opening 23 with a centre Md.

Depending on the seal, the position of the opening 23 may be different. The opening may be displaced in a horizontal direction and in a direction perpendicular thereto, i.e. in the yz plane. Depending on the position of the opening, also the horizontal (y) position of the electronic component of the wall feedthrough 2 changes. Seals with different opening positions may easily be stored.

If one views the centres Mo of the wall feedthrough and Md of the seal in a plane, one will notice that the centres Mo and Md do not coincide if the opening 23 of the seal 22 is not centrally positioned. In this case, the centres Mo and Md have a distance A from each other. FIGS. 5a and 5b show different positions of the opening 23 of the seal 22.

In order to be able to compare the centres Mo and Md with each other, one can imagine them projected in the same plane. Thus, the distance vector is two-dimensional. According to the invention, this is what is understood by "distance of the centres".

The different position of the opening 23 of the seal constitutes the first means for horizontally positioning the electronic component 13 relative to the wall feedthrough 2.

The opening is bordered by a collar 24 that is made up of individual collar elements 24a, 24b, 24c, 24d. The collar elements 24a-d each have a width Da, Db, Dc, Dd. The different positioning of the opening 22 of the seal 22 results in different widths of the wall segments 24a-d in different seals.

As a rule, only minor deviations need to be corrected for different plug-in connectors, so that the distance A and the different widths Da-d of the wall segments resulting therefrom are small.

FIGS. 5a and 5b show a schematic top view of a seal according to the invention. In FIG. 5a, the width Dc is greater than the width Dd. Here, the seal offsets the position of the electronic component vertically downwards. In FIG. 5b, the width Dc is smaller than the width Dd. Moreover, the width Da is smaller than Db. As a result, the electronic component is offset to the right in a vertical and a horizontal direction.

FIG. 6 shows the three-dimensional form of the seal mentioned above. An axially protruding, circumferential web 26 can be inserted into the opening of the wall segment 2. The electronic component 13 is inserted through the opening 23. The collar 24 of the seal rests against the electronic component 13.

FIGS. 6 and 7 show a printed circuit board plug 27 that is connected to the printed circuit board 10 using solder terminals. The printed circuit board plug 27 is connected to the electronic component 13 via the conductor paths of the printed circuit board 10. The connected cable 28 extending from the printed circuit board plug 27 can be connected to the electronics of a device (not shown). As a rule, the cable leads to a printed circuit board of the device and is here also connected using a printed circuit board plug.

The printed circuit board plug 27 allows a direct replacement with another printed circuit board with an already attached electronic component. The plug is disconnected from one variant and is connected to a new variant which will then only have to be pushed into the wall feedthrough and connected thereto. A so-called retrofitting of the socket on the device is simple and can be quickly realised.

List of Reference Numerals

| | | | |
|---|---|---|---|
| 1 | Device socket | 11. | Notch |
| 2 | Wall feedthrough | 12. | Plug-in connector |
| 3 | Collar | 13. | Electronic component |
| 4 | Bore | 14. | Solder termination element |
| 5 | Inwardly protruding part | 15. | Bore |
| 6 | Outwardly protruding part | 16. | Pin |
| 7 | Locking means | 17. | Bore |
| 8 | Locking hook | 18. | Front housing portion |
| 9 | Recess | 19. | Rear housing portion |
| 10 | Printed circuit board | 20. | Pin |
| Md | Centre of the seal | 21. | Bore |
| Mo | Centre of the wall feedthrough | 22. | Seal |
| A | Distance of centres Mo, Md | 23. | Opening |
| Da-d | Width of the collar | 24. | a, b, c, d collar |
| | | 25. | Opening |
| | | 26. | Web |
| | | 27. | Printed circuit board plug |

The invention claimed is:

1. A device socket comprising a wall feedthrough having a circumferential wall extending in an axial direction and defining a wall feedthrough opening that lies in a plane transverse to the axial direction, a printed circuit board releasably connected to said wall feedthrough, an electronic component attached to said printed circuit board, and a seal positioned within said wall feedthrough opening and lying in a plane transverse to the axial direction, said seal defining a seal opening lying in a plane transverse to the axial direction, said seal receiving and sealing the electronic component through the seal opening and wherein the position of the seal opening with respect to the position of the wall feedthrough opening orients the position of said electronic component relative to said wall feedthrough in the transverse direction.

2. The device socket of claim 1 wherein said device socket comprises axial adjustment means for positioning said electronic component in a an axial direction relative to said printed circuit board and thus axially adjusting the position of the electronic component with respect to the wall feedthrough.

3. The device socket of claim 2 wherein said axial adjustment means comprises solder termination elements on said electronic component and bores on said printed circuit board into which said solder termination elements of said electronic component engage.

4. The device socket of claim 1 wherein a snap-in hook is provided for releasably connecting said printed circuit board to said wall feedthrough.

5. The device socket of claim 4 wherein said snap-in hook is integrally moulded to said wall feedthrough.

6. The device socket of claim 1 wherein said seal opening has a center and wherein said wall feedthrough opening has a center, said center of said seal opening being offset a distance from said center of said wall feedthrough opening in said transverse direction, said distance being greater than zero.

7. The device socket of claim 1 wherein said electronic component is one of an electro-optical converter and a plug-in connector, said electronic component having a socket opening on a plug-in side.

8. The device socket of claim 1 wherein said device socket has a printed circuit board plug that is connected on the one hand to said printed circuit board and on the other hand to an electrical cable for being connected to an electronic circuit.

9. A device socket assembly comprising a device socket, said device socket having a wall feedthrough extending in an axial direction, a printed circuit board connectable to said wall feedthrough, an electronic component attached to said printed circuit board, and a group of different planar seals, each of said seals having an opening lying in a seal plane, the position of said opening being different from the position of said opening in a different seal of said group of seals, a selected one of said seals of said group of seals mounted to said wall feedthrough in a plane transverse to the axial direction, said electronic component engaging into an opening of a seal mounted to said wall feedthrough such that a position of said electronic component relative to said wall feedthrough is adjusted in a transverse direction by said seal.

* * * * *